UNITED STATES PATENT OFFICE.

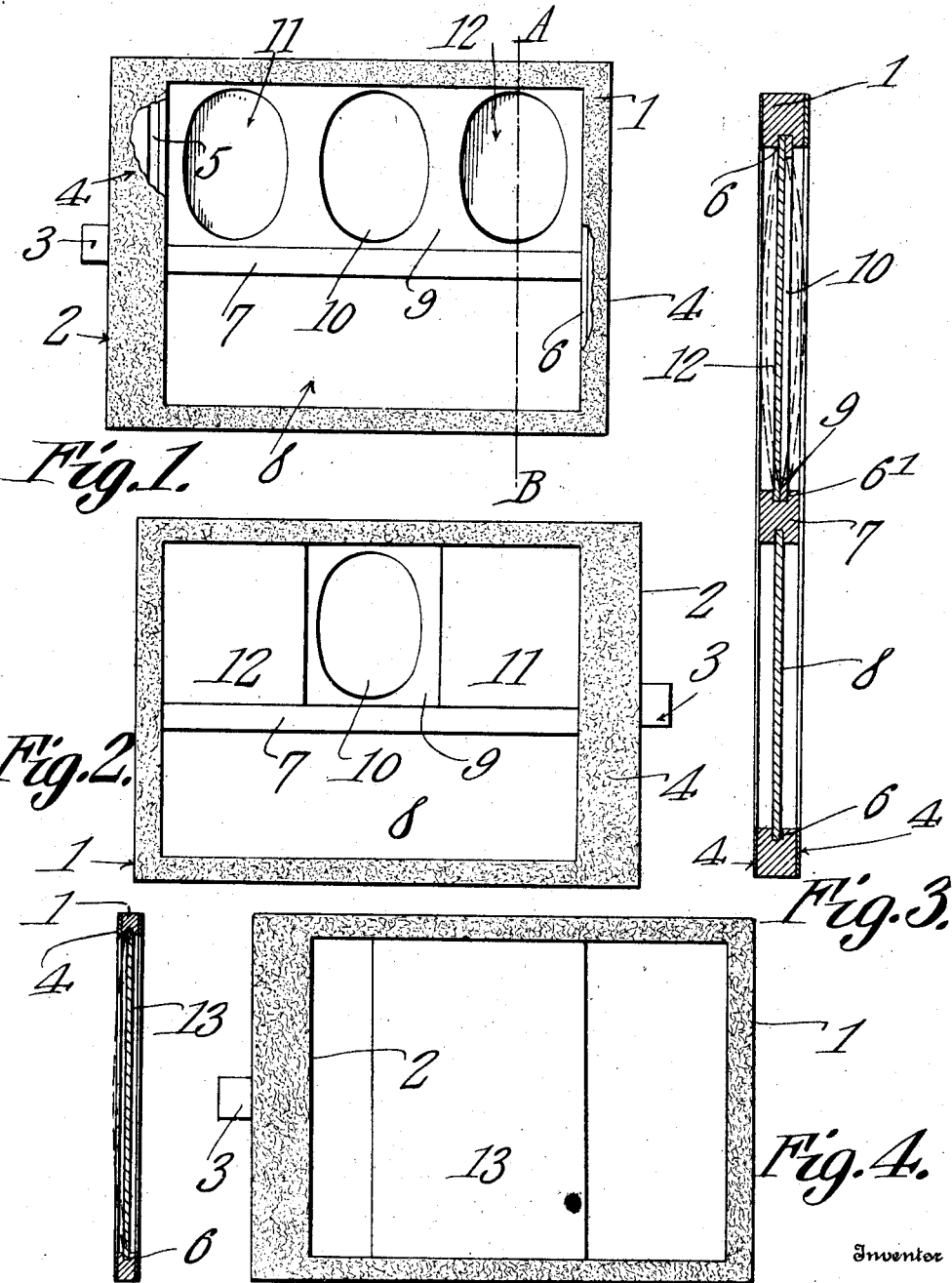

JAMES CHARLES DRAKE, OF ROCHESTER, MINNESOTA, ASSIGNOR TO THE CONLEY CAMERA CO., OF ROCHESTER, MINNESOTA.

MULTIPLE-EXPOSURE ATTACHMENT FOR CAMERAS.

982,707.  Specification of Letters Patent.  Patented Jan. 24, 1911.

Application filed February 10, 1910.  Serial No. 543,009.

*To all whom it may concern:*

Be it known that I, JAMES C. DRAKE, a citizen of the United States, residing at Rochester, in the county of Olmsted and State of Minnesota, have invented a new and useful Multiple-Exposure Attachment for Cameras, of which the following is a specification.

This invention has reference to improvements in attachments for cameras whereby multiple exposures may be made upon a single plate or other photo-sensitive surface.

It is the object of the present invention to provide a slide which may be inserted in the camera directly in front of the ground glass holder so that the plate holder may be inserted in the camera between the multiplying slide and the ground glass holder, the same as though the multiplying slide were absent, and the multiplying slide may be inserted and removed the same as the plate holder.

The invention will be best understood from a consideration of the following detailed description in connection with the accompanying drawings forming a part of this specification, in which drawings,—

Figure 1 is a face view of the multiplying slide embodying the present invention. Fig. 2 is a similar view of the opposite side from that shown in Fig. 1. Fig. 3 is a section of the line A—B of Fig. 1, but on a larger scale. Fig. 4 is a view of the multiplying slide with a somewhat different arrangement than shown in Fig. 1. Fig. 5 is a cross section through the structure of Fig. 4.

Referring to the drawings there is shown an open rectangular frame 1 of a size adapted to the particular camera in which the device is to be used, the size of the frame 1 varying with the different sizes of cameras. The frame 1 will conform generally to the shape of the plate holder to be used with the camera, but may be, and preferably is materially thinner. One end 2 of the frame 1 may be wider than the other end and to this end 2 there is secured an appropriate handle 3.

Focusing cameras are usually provided with a focusing screen, usually of ground glass, mounted in a frame at the back of the camera, and this frame is yieldable so that a plate-holder may be introduced into the camera and held in place against the back end thereof by the engagement with the holder of the ground glass carrying frame displaced by the insertion of the plate holder. The image produced by the lens of the camera is focused upon the ground glass screen and when the plate holder is inserted and the ground glass screen is thereby displaced, the sensitive surface of a plate in the holder is brought into the focal plane so that the image produced by the lens is focused upon the sensitive surface and the image produced thereby is therefore in the same focal condition as observed by the operator upon the ground glass screen.

In accordance with the present invention the frame 1 is introduced between the ground glass screen and the back of the dark box of the camera so that the ground glass screen is normally displaced and then the image is focused in the usual manner upon such displaced ground glass screen so that when the plate holder is ultimately introduced without removing the frame 1 the sensitive surface carried by the plate-holder is then in focus as before.

In order to render the frame 1 light tight both the rear and front faces of this frame may be covered with a layer 4 of felt or other suitable material, it being preferable that the entire surface of said frame be so covered, although this is not absolutely necessary. The end members of the frame 1 may be provided with the usual grooves 5, for the temporary locking of the frame in place when inserted in the camera and for in turn locking the plate holder in place, these grooves being common expedients for the purpose. The felt covering may extend over these grooves and will yield sufficiently for the usual ridges found on the plate holders to seat therein.

Extending around the interior of the frame 1 is a groove 6 designed to receive the edges of certain members which will be described.

The frame 1 may be adapted to the taking of multiple pictures of various outlines either entirely covering the plate or circumscribed by various shaped mats and any number of exposures from full plate exposure or half plate exposure to six or more exposures upon a single plate may be provided.

In order to produce a comparatively large number of exposures on a single plate there is provided a longitudinal division bar 7 provided on opposite sides with longitudinal grooves 6' matching the grooves 6 in the corresponding top and bottom members of the frame 1. A plate or web 8 may be seated in the matching grooves in the member 7 and one of the side members of the frame 1, this web or plate being of opaque material and may be of a size to occupy substantially half the frame 1, the bar 7 dividing the frame into two longitudinal sections. In the other section of the frame 1 between the bar 7 and the corresponding other side member of the frame 1, there is a web or mat 9 which may be provided with a number of openings 10 shown in the drawing as three in number and elliptical in outline, but it is evident that these openings may be of other shapes and more or less in number. Also lodged in the same grooves as is the web or mat 9 are two plates 11 and 12 in the particular structure shown in the drawings. When three openings 10 are used then two plates 11 and 12 are employed, but if only two openings 10 are used then one plate 11 or 12 is sufficient. Should more openings 10 be used, then the number of plates 11 and 12 will be one less than the number of openings, and the plates will be so proportioned in size as to cover all the openings but one.

The plates 11 and 12 are freely movable along the web 9 so as to cover any two of the openings 10, in the particular example shown, and leave the other opening free. The web 9 and plates 11, 12 are made of opaque material and the sensitive surface is exposed only through the uncovered opening 10.

If it is desired to subject the sensitive surface to a number of successive exposures, then the frame 1 is introduced into the camera with any one of the openings 10 uncovered. Let it be supposed that the first in order of one of these openings is uncovered, then the image is focused through such opening upon the ground glass plate behind the same, after which the plate holder is introduced and the exposure is made in the usual way. The first opening is then covered by moving the appropriate plate 11 or 12, so as to leave the second opening 10 uncovered. The image of the object to be photographed is then focused through the second opening and the exposure is made in the usual manner. The same procedure will permit an exposure of the image through the third opening, the second opening having been covered and the exposed portions of the plate protected, by an appropriate shifting of the plates 11 and 12. Now by removing the frame 1 and reversing the same the section of the plate already exposed will be protected by the web 8 and the unexposed section of the plate may be successively exposed through the several openings 10 in the same manner already described.

By means of the particular structure shown in Figs. 1, 2 and 3 of the drawings, it is possible to produce six exposures upon a single plate. Suppose, however, that it is desirable to cover the full surface of the plate with the multiple exposures, then the web 9 which is made of elastic material is sprung out of the frame 1, and the two plates 11 and 12 are allowed to remain therein. These plates may be moved to various positions in the particular structure shown and are so proportioned as to permit the exposure of substantially all the section of the plate occupied by them. By reversing the holder 1 the other section of the plate may be exposed in the manner already described, so that with the exception of the narrow band occupied by the bar 7 the entire surface of the plate may be acted upon by successive images.

If it be assumed that it is desirable to make a less number of exposures but these exposures to cover entirely the active surface of the plate, then the web 8 is also sprung out, and the bar 7 is removed, the plates 11 and 12 having been either previously sprung out or may be removed at this time. Then one or more large plates 13 of sufficient size may be sprung into the top and bottom grooves 6. If it be desirable to make each exposure take substantially half the size of the plates used then a single web or plate 13 will be sprung into the frame 1, this plate being of the width substantially half the length of the opening of the frame 1. If a greater number of exposures be desired on the plate, but to extend across the plate to its full width, then two or more plates 13 of proper width may be used. If it is to be assumed that but two exposures are to be made on each plate and that a single web 13 is to be employed, then this web will be moved to one end of the frame 1 and the exposure made in the manner already described, and then it will be moved to the other end of the frame, and the second exposure is made in like manner.

By the structure described it is possible to make any number of exposures desired upon a single plate within the limits provided.

By making the webs 8 and 9 and the plates or sheets 11 and 12 of thin opaque material, such for instance as thin pressboard suitably blackened, or thin vulcanized rubber, the frame 1 may be made very thin so as to occupy but little space between the back of the dark box of the camera and the frame supporting the focusing screen. By making the webs of elastic material they may be readily sprung into and out of place thus greatly simplifying the whole structure.

What is claimed is:—

A multiplying attachment for cameras comprising a frame of open construction adapted to be introduced into a camera adjacent to and directly in front of the plate holder, said frame being provided with a grooved division bar and opaque webs of elastic material adapted to be sprung into and out of the frame into engagement with the same and with the division bar, one of the webs being provided with passages and the other web being imperforate, and sheets of opaque material of less extent than the web with passages therethrough, said sheets being adapted to be introduced into the frame, and moved along the web with passages therethrough to cover chosen ones of the passages at will.

In testimony that I claim the foregoing as my own, I have hereto affixed my signature in the presence of two witnesses.

JAMES CHARLES DRAKE.

Witnesses:
S. A. WARNER,
H. H. SKAUG.